Feb. 1, 1949.   W. F. AYCOCK   2,460,442
TRAILER
Filed Feb. 7, 1947   2 Sheets-Sheet 1
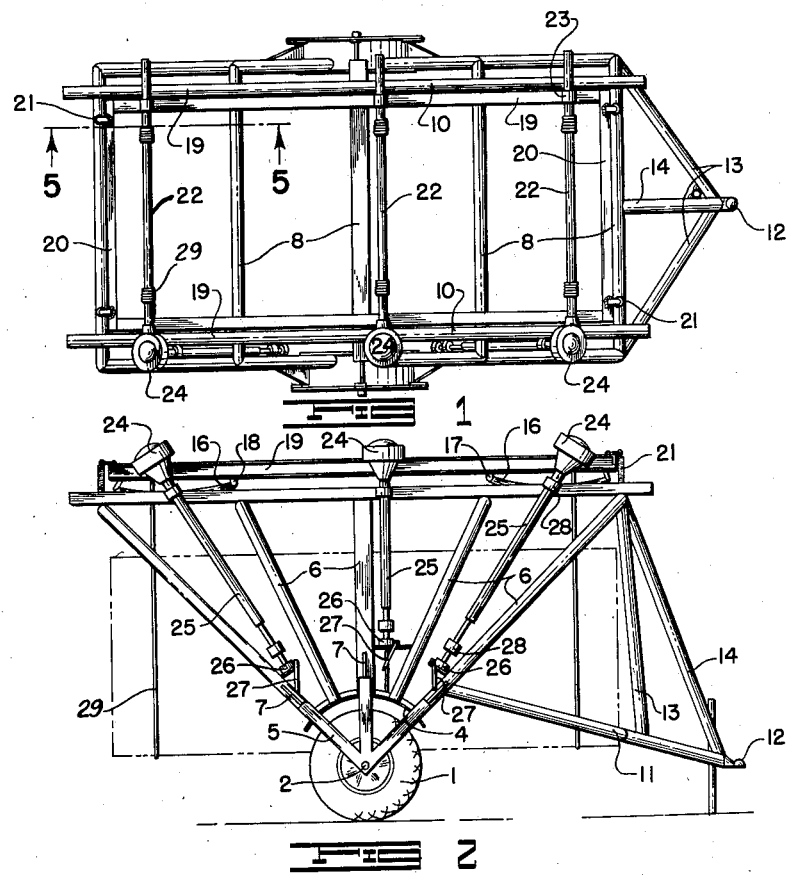
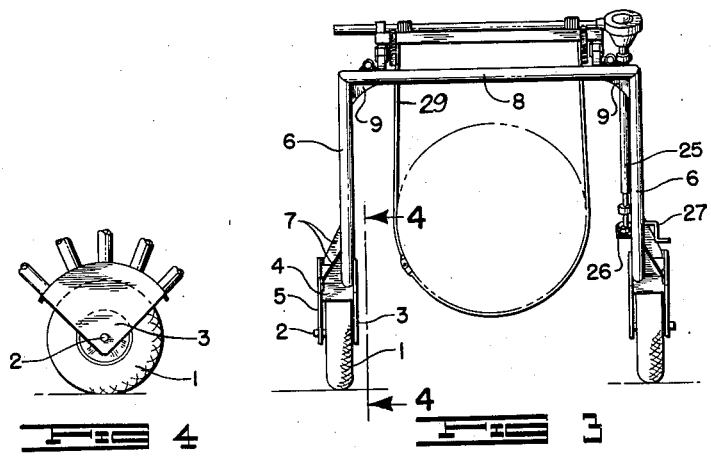
INVENTOR.
WALTER F. AYCOCK
BY
Lyon & Lyon Feb. 1, 1949.  W. F. AYCOCK  2,460,442
TRAILER Filed Feb. 7, 1947  2 Sheets-Sheet 2

*INVENTOR.*
WALTER F. AYCOCK
BY Lyon & Lyon

Patented Feb. 1, 1949

2,460,442

UNITED STATES PATENT OFFICE 2,460,442

TRAILER

Walter F. Aycock, El Centro, Calif., assignor, by mesne assignments, to Tank Fertilizer, Inc., Brawley, Calif., a corporation of California Application February 7, 1947, Serial No. 727,144

4 Claims. (Cl. 214—75)

My invention relates to trailers, more particularly to trailers adapted to carry bulky cargo and so arranged as to be rolled astraddle the cargo, and the cargo suspended from the trailer for transportation.

Included in the objects of my invention are:

First, to provide a trailer which is particularly designed to carry objects which are too bulky to be carried conveniently by a conventional trailer.

Second, to provide a trailer of this class which employs a rigid but relatively light weight frame structure directly supported from the trailer wheels; that is, an unsprung frame structure, and a resiliently mounted cargo suspension frame carried by the unsprung frame whereby road shocks on the cargo are minimized.

With the above and other objects in view as may appear hereinafter, reference is directed to the accompanying drawings in which:

Figure 1 is a plan view of my trailer.

Figure 2 is a side view thereof.

Figure 3 is a rear end view thereof.

Figure 4 is a fragmentary view taken from the line 4—4 of Figure 3, showing the construction of the wheel mounting.

Figure 5:
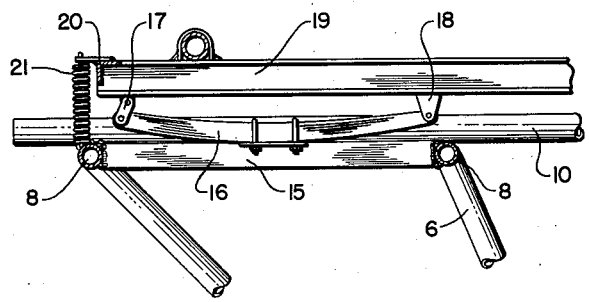
Figure 5 is an enlarged fragmentary sectional view taken through 5—5 of Figure 1 showing the spring suspension.

The trailer is mounted on a pair of wheels 1 having axles 2, the inboard ends of which are secured to segmental plates 3. Each segmental plate is secured to an arcuate reinforcing plate and mud guard 4 which is provided with radiating outboard straps 5 joined together and to the outboard end of the corresponding axle 2.

Secured to the reinforcing plate 4, and radiating upwardly therefrom are struts 6. In the structure illustrated five such struts are shown, some of which are braced relative to the reinforcing plate 4 and straps 5 by means of gussets 7. The corresponding struts 6 radiating from the two wheels 1 are joined together by cross bars 8 so that each pair of struts 6 and their cross bar forms a U-shaped frame. The junctures between at least some of the struts 6 and cross bars 8 are reinforced by gussets 9.

The radiating struts 6 are so proportioned that the cross bars 8 define a plane and are connected by longitudinally extending tie bars 10 so that the cross bars and tie bars form a rectangular framework.

The forward pair of struts 6 are joined by a forwardly directed yoke 11 attached to the struts near their juncture with the reinforcing plate 4. The yoke 6 is provided with a suitable trailer hitch 12 and is braced by struts 13 and 14 extending from the forward cross bar 8.

The forward pair and rearward pair of cross bars 8 are joined near each side by a spring mounting beam 15 to which is secured the central portion of a multiple leaf spring 16. The four springs so provided are connected by shackles 17 and 18 to longitudinal beams 19 of a cargo suspending frame. The longitudinal beams 19 are connected by cross beams 20 so as to form a rectangular framework. In addition to the leaf springs 16, snubber springs 21 are disposed in tension and extend between the cargo frame and the sub-frame comprising the cross bars 8 and tie bars 10. The longitudinal beams 19 of the cargo frame are connected by hoist shafts 22 suitably journaled in bearings 23. One end of each shaft 22 is provided with a transmission 24 which in turn is connected to telescoping shafts 25 extending downwardly along one set of struts 6 as shown best in Figure 2. The lower extremities of the telescoping shafts are connected to gear units 26 having crank handles 27 so that the shafts may be manually rotated. The telescoping shafts permit relative movement between the cargo frame and the struts 6. Inasmuch as such relative movement may involve angular movement as well as longitudinal movement, universal joints 28 are provided at the extremities of the telescoping shafts 25.

The hoist shafts 22 are wrapped with chains or cables 29 preferably disposed in pairs so that they may be attached to or extended under tanks or other bulky objects.

Figure 6:
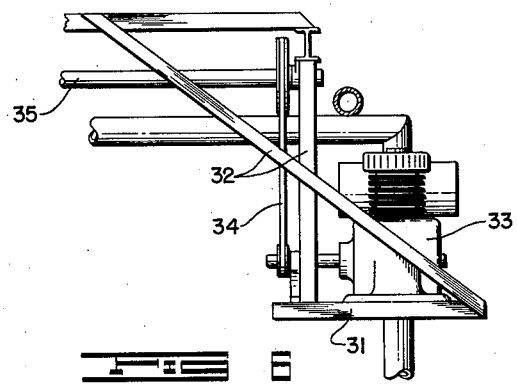
Figure 6 is a fragmentary view showing a modified arrangement whereby a motor drive is incorporated for the purpose of lifting the cargo into the trailer, the view being taken substantially along the line 6—6 of Figure 7.
Figure 7:
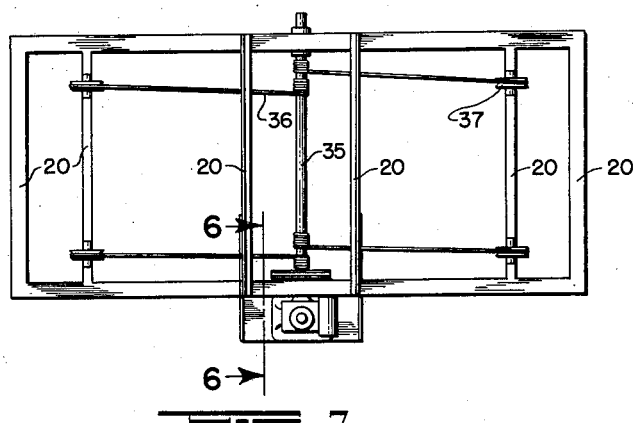
Figure 7 is a reduced plan view of the modified cargo carrying frame.

In place of the manually operated means for raising and lowering the cargo, a motor drive may be provided, as shown in Figures 6 and 7. In this construction, a small platform 31 is suspended by means of suspension framework 32 from one side of the cargo frame between a pair of struts 6. A motor such as a gasoline motor 33 is mounted on the platform 31 and is connected by drive means 34 such as a pulley and belt drive to a cable drum shaft 35 journaled from the cargo frame. The cable drum shaft is wrapped with hoisting cables 36 which cables extend over pullies 37 located near the corners of the frame so that the cargo may be suspended from its corners.

As shown in Figure 3, the trailer may be backed over the object to be carried, there being ample clearance between the sets of struts 6 and the cross bars 8. During transportation the cargo is suspended from the spring mounted cargo frame and is cushioned from the road shocks. The framework which comprises the struts 6, cross bars 8 and tie bars 10 is "unsprung" except for such cushioning as may be provided by the pneumatic wheels 1. This is desirable for the reason that the dimensions of the frame must be kept to a minimum and at the same time the frame must be inherently rigid, thus, virtually precluding the use of springs between the wheels and the framework.

Many other embodiments of the invention may be resorted to without departing from the spirit of the invention.

I claim:

1. A trailer for handling bulky cargo, comprising: a pair of wheels; a pair of wheel mountings of generally segmental form each adapted to straddle and journal a wheel; a set of radiating upwardly diverging struts rigidly connected to each wheel mounting; a horizontally disposed rectangular top frame rigidly secured to said struts, said top frame and sets of struts defining a cargo receiving space; a cargo frame; springs yieldably supporting said cargo frame relative to said top frame; and means for suspending bulky cargo from said cargo frame.

2. A trailer for handling bulky cargo, comprising: a wheel mounted rigid frame structure adapted to straddle the cargo to be carried; a cargo suspension frame; a set of springs for yieldably supporting said cargo frame above said rigid frame; suspension means depending from said cargo frame through said rigid frame structure for attachment to said cargo; and hoist means for adjusting said suspension means including hoist shafts carried by said cargo frame, a motor platform suspended from said cargo frame, a motor mounted on said platform and drive means between said motor and said hoist shafts.

3. A trailer for handling bulky cargo, comprising: an elevated main frame; side frame structures including downwardly converging struts formed to the sides of said main frame, and a wheel mounting means at the lower extremities of said struts; a forward frame structure including a yoke joined to the forward of said converging struts and encircling the forward end of said main frame and struts extending between said yoke and main frame structure; a cargo frame; springs for supporting said cargo frame relative to said main frame; and means for suspending a cargo from said cargo frame within the cage formed by said side frame and forward frame structures.

4. A trailer for handling bulky cargo, comprising: an elevated main frame; side frame structures including downwardly converging struts formed to the sides of said main frame, and a wheel mounting means at the lower extremities of said struts; a forward frame structure including a yoke joined to the forward of said converging struts and encircling the forward end of said main frame and struts extending between said yoke and main frame structure; a cargo frame; springs for supporting said cargo frame relative to said main frame; means for raising and lowering a cargo within the cage formed by said side frame and end frame structures, including a power unit suspended from said cargo frame between and guarded by the struts of one of said side frame structures and hoist means carried by said cargo frame for connection with a cargo.

WALTER F. AYCOCK.

REFERENCES CITED

The following references are of record in the file of this patent:

UNITED STATES PATENTS

| Number | Name | Date |
|---|---|---|
| 1,531,180 | Erickson | Mar. 24, 1925 |
| 2,259,558 | Evans | Oct. 21, 1941 |
| 2,299,971 | Foshee | Oct. 27, 1942 |
| 2,404,898 | Aycock | July 30, 1946 |